March 13, 1956  I. W. COX  2,738,393
CIRCUIT BREAKERS AND THE LIKE HAVING POWER ELEMENTS
Filed March 12, 1952  3 Sheets-Sheet 1
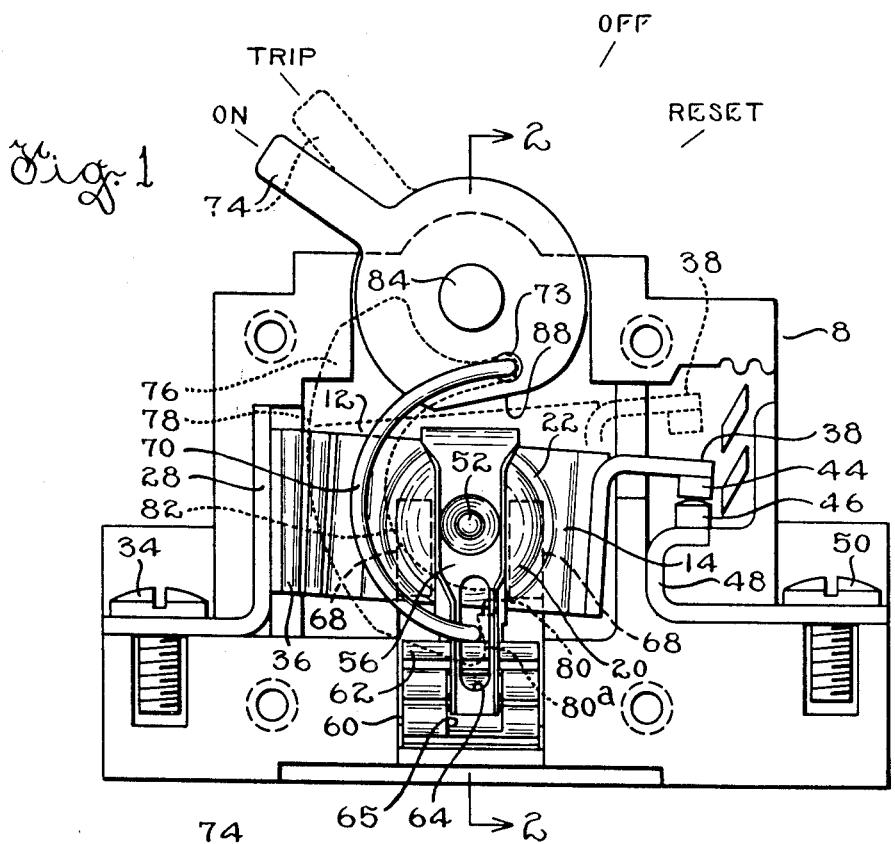
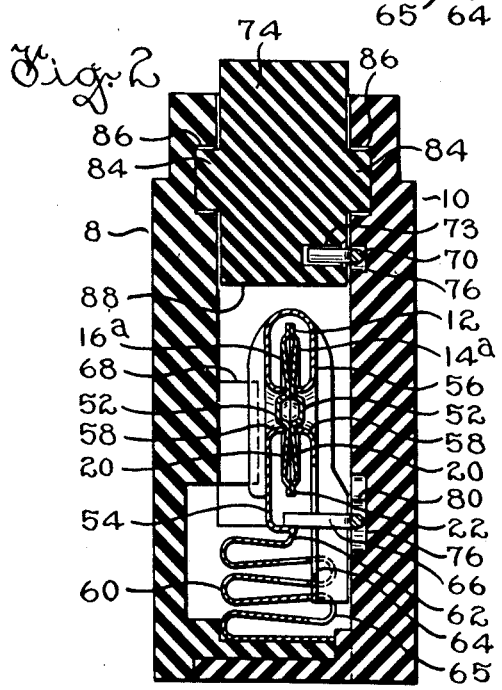
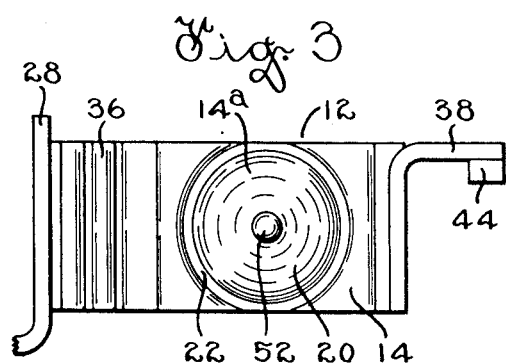
Inventor
Irvin W. Cox
By W. E. Lyon
Attorney March 13, 1956 — I. W. COX — 2,738,393
CIRCUIT BREAKERS AND THE LIKE HAVING POWER ELEMENTS
Filed March 12, 1952 — 3 Sheets-Sheet 2
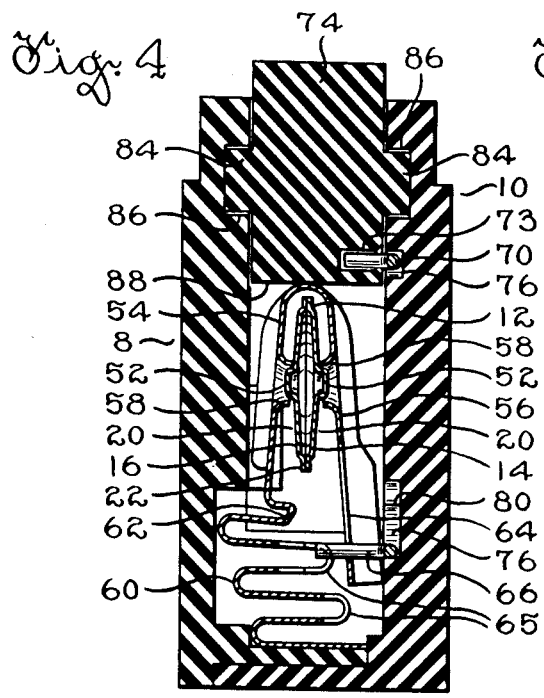
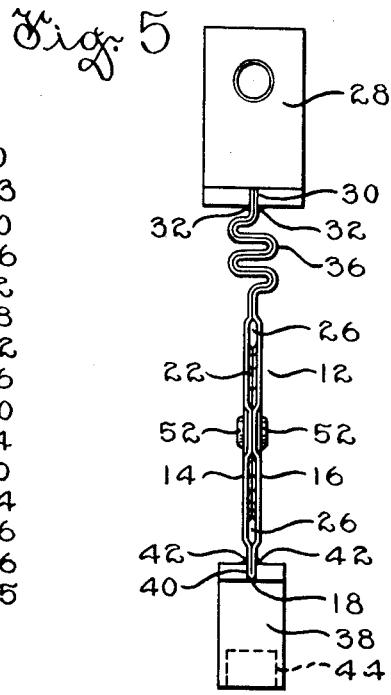
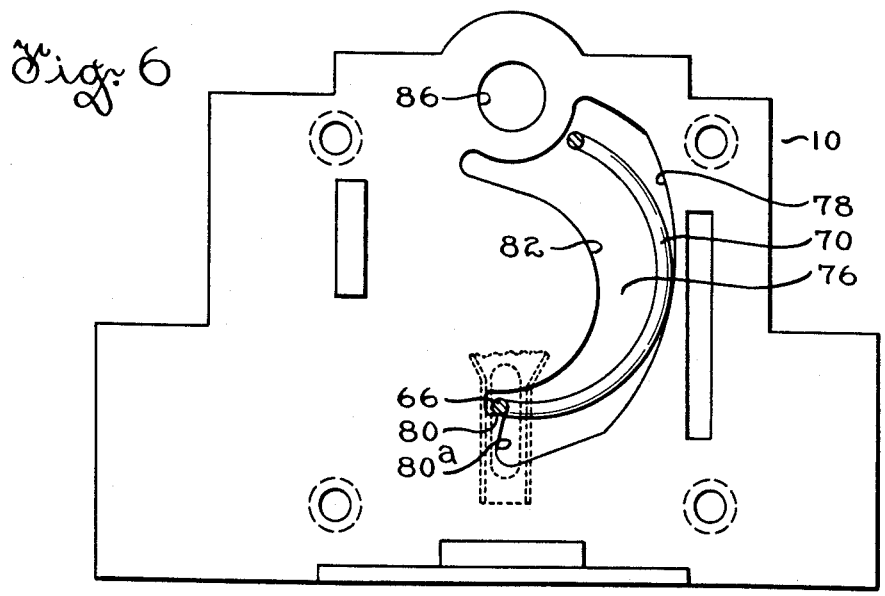
Inventor
Irvin W. Cox
By W. C. Lyon
Attorney March 13, 1956 I. W. COX 2,738,393
CIRCUIT BREAKERS AND THE LIKE HAVING POWER ELEMENTS
Filed March 12, 1952 3 Sheets-Sheet 3
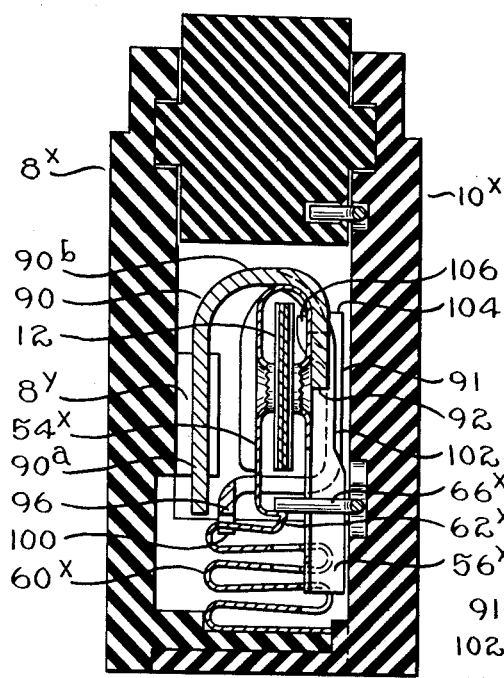
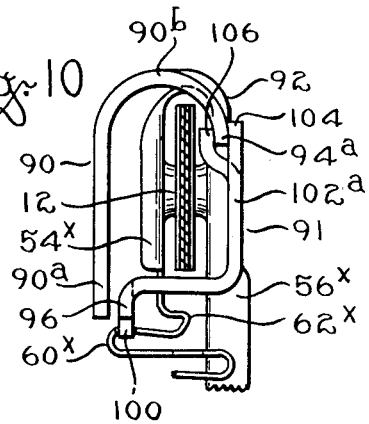
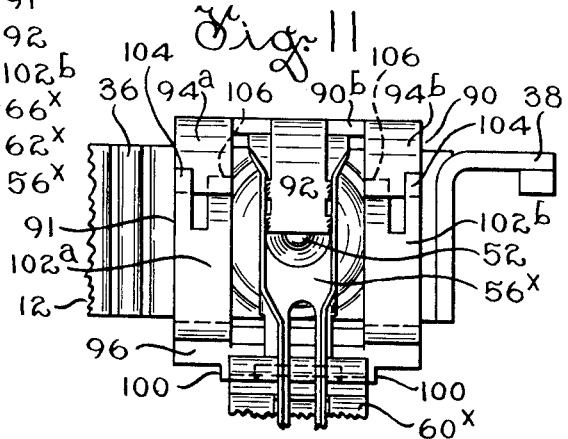
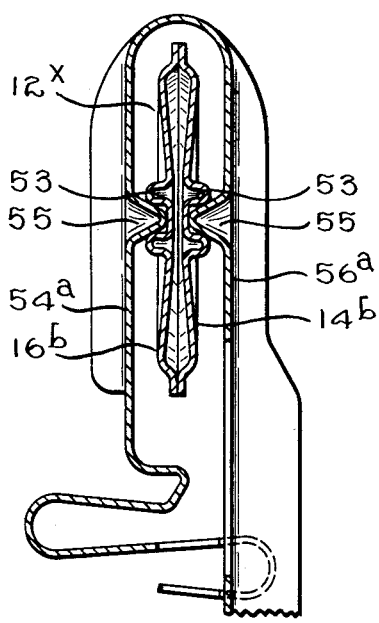
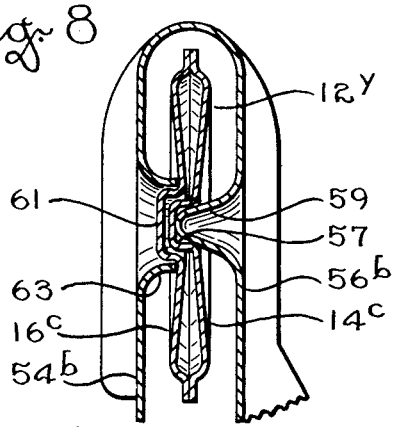

United States Patent Office 2,738,393
Patented Mar. 13, 1956

2,738,393

CIRCUIT BREAKERS AND THE LIKE HAVING POWER ELEMENTS

Irvin W. Cox, West Allis, Wis., assignor to Cutler-Hammer, Inc., a corporation of Delaware Application March 12, 1952, Serial No. 276,167

12 Claims. (Cl. 200—88)

This invention relates to improvements in circuit breakers and the like having power elements. The invention relates more particularly to the electro-thermal power elements and other parts of such circuit breakers.

A circuit breaker of such type is disclosed and claimed in my copending application, Serial No. 276,169, filed March 12, 1952, now Patent Number 2,704,313, granted March 15, 1955 for improvements in Circuit Breakers. A power element broadly similar to that herein disclosed is shown in my Patent No. 2,484,932, dated October 18, 1949.

A primary object of this invention is to provide an improved power element which has an inherent trip temperature, thus rendering further calibration thereof unnecessary.

Another object of the invention is to provide an electro-thermal power element operated circuit breaker which is more sensitive than circuit breakers heretofore proposed and has smoother circuit breaking action.

Another object of this invention is to provide an otherwise complete circuit breaker of such type in which the sensitivity thereof is increased by the addition of only a few parts, which may be omitted when such higher sensitivity is not required.

Another object of the invention is to provide an improved electro-thermal vapor pressure operated power element which may be readily associated with other elements to form a circuit breaker composed of a minimum number of separate parts.

A further object of the invention is to provide an electro-thermal vapor pressure operated power element which is relatively inexpensive to make and charge and which is unusually sensitive to changes in electric current passing therethrough.

Certain of said objects are obtained by adding to the kick-out member a magnetic trip which consists of two attracting magnetic elements mounted so as to be relatively movable toward each other as the kick-out member of the circuit breaker is moved toward unlatched position by the electro-thermal power element. The tractive force of the magnetic trip increases as the elements are moved closer together and acts to supplement the force of the power element.

Certain other objects of the invention are provided by constructing a power element from a thin metal sheet which is folded upon itself to provide two adjacent walls. Intermediate the ends of the member thus formed, a diaphragm is made by a continuous weld passing around an area enclosed thereby. The walls of the element extend from opposite edges of the diaphragm to form supports by which the element becomes a movable current-carrying part of a circuit breaker. It is desirable both for heat dissipation and to facilitate welding that a portion of the walls immediately adjacent and exterior of the welded seam be spaced to provide an air gap therebetween which will more readily dissipate electro-thermal heat outside of the diaphragm and cause apparent concentration thereof at the diaphragm. At the time of making the continuous weld the diaphragm may be charged with a predetermined amount of water either in liquid or vapor state. Other types of vaporizable charges may be used in place of water.

The power element so constructed is flexibly associated with a terminal and carries a movable contact which engages with and disengages from a fixed contact. The power element thus performs as a conductor, a mechanical lever for carrying a contact, and a power element. A spring-biased kick-out member is pivotally associated with the power element to normally flex it in a direction to open the contacts. A keeper and latch lock the kick-out member with the contacts closed. The keeper is connected with the kick-out member so that the expansion of the power element disengages the keeper from the latch to unlock the kick-out member. By arranging the power element so that it flexes in the plane of the diaphragm considerable space is conserved and efficiency increased by the resulting simplification of motion transmission elements.

The novel features which are considered characteristic of the invention are set forth with particularity in the appended claims. The invention itself, however, both as to its organization and its operating characteristics, together with additional objects and advantages thereof, will be best understood from the following description of a specific embodiment when read in connection with the accompanying drawings, in which:

Figure 1 is a side elevation, double scale, of a circuit breaker including a power element constructed in accordance with my invention; the circuit breaker being shown in closed position, with the cover member omitted for clarity of illustration.

Fig. 2 is a sectional view on the line 2—2 of Fig. 1.

Fig. 3 is a fragmentary detail view, in side elevation, of the power element assembly.

Fig. 4 is a sectional view similar to Fig. 2, but with the diaphragm of the power element expanded and the circuit breaker tripped, as indicated in dotted lines in Fig. 1.

Fig. 5 is a detail top plan view of the power element assembly.

Fig. 6 is a side elevational view of the inner recessed face of the cover member, certain of the breaker parts being included.

Fig. 7 is a further enlarged fragmentary sectional view of a modified form of a snap-on type pivotal connection between the diaphragm and the kick-out or latch member.

Fig. 8 is a fragmentary sectional view of still another modified form of a snap-on type pivotal connection.

Fig. 9 is a sectional view similar to Fig. 2, but with slight modifications in the dimensions of the main cavity in the breaker housing, etc., to accommodate the magnetic trip assisting elements herein contemplated.

Fig. 10 is a fragmentary view in end elevation (partly in section) of parts including the magnetic trip members and the kick-out member, and Fig. 11 is a fragmentary view in side elevation of the power element, the magnetic trip members and the kick-out member.

The circuit breaker illustrated in Figs. 1 to 6, inclusive, of the drawings includes a housing, a flexibly mounted power element functioning as a conductor and contact carrier, a spring-biased kick-out member to move the circuit breaker to open position, and a keeper and latch normally locking the circuit breaker in closed position and disengageable by the expansion of the diaphragm of the power element, and a manually operable control member for resetting the circuit breaker with a snap action. Each of these elements or sub-combinations thereof will be hereinafter described in particular and their respective co-functional relationship described. The housing consists of a base 8 and cover 10 of insulating material each adapted to be produced by a straight line molding operation. The base 8 is recessed to provide operating space for the circuit breaker and has grooves and projections cooperating with the cover 10 to secure the fixed elements of the circuit breaker. The cover 10 is secured to the base 8 by suitable fastening means and also has conformations cooperating with the base 8 to provide guides for the movable elements and supports for the fixed elements. As shown in Fig. 6, the cover 10 has a depression which forms cam surfaces which cooperate with the C-spring to provide for snap closing or opening of the circuit breaker.

The power element designated generally at 12 functions as: a conductor in the circuit-breaking mechanism, a support for the movable contact, a lever through which the spring-biased kick-out member functions, and also the means for supplying electro-thermal power for unlatching the kick-out member. Such power element is made from a ribbon or sheet of thin metal such as stainless steel (other suitable metals may be employed) which is preferably folded about a central line or bight as at 18 (see Fig. 5) to form wall 14 and an opposed wall 16. Spaced from the ends thereof each wall is formed with an inwardly biased disc-like area 20 surrounded by an annular portion 22. These annular portions 22 are in surface contact and a continuous seam weld joins such contacting surfaces to define a diaphragm. The walls 14ᵃ and 16ᵃ of the diaphragm are normally urged inwardly into approximate contact with each other substantially centrally thereof. Said walls 14ᵃ and 16ᵃ return, with a snap action, to normal position upon a predetermined decrease in internal pressure, after operating expansion of the diaphragm. The portions of walls 14 and 16 immediately adjacent the exterior of rings 22 are spaced from each other to provide air gaps 26, 26 (see Fig. 5) so that heat generated in said walls by the passage of electric current therethrough will be readily dissipated from both surfaces of the walls at such gaps. Such construction limits the area short-circuiting the seam-weld at the time of welding and thus facilitates welding.

At the time the continuous seam weld is made the diaphragm is charged or filled. The charge may be a suitable vaporizable material, the amount of which may be determined in a variety of ways. For example, a drop of water of accurately controlled volume may be inserted within the diaphragm just before the welding pressure and heat are applied. In another example, the weld may be made in a vapor atmosphere such as steam atmosphere. The amount of steam entrapped in the diaphragm will always be fixed by the predetermined cubic capacity of the diaphragm and the temperature, pressure, and saturation of the steam atmosphere. Other types of vaporizable fill may be used, and as described in the aforesaid patent the power element will be subjected to sharp expansive force at the boiling point of the fill or at a few degrees rise above such boiling point.

The power element 12 is mounted so that it will flex in the plane of the diaphragm to permit said element to act as a lever and as the carrier for the movable contact. To accomplish this a mounting terminal 28 is secured to one end of the power element and held in the housing by the cooperation of the base 8 and cover 10. It is preferable to have a slot 30 (see Fig. 5) in the mounting terminal into which the ends of walls 14 and 16 are fitted and secured by welding, as indicated at 32, 32. A binding screw 34 or other suitable fastening device may be used to connect the mounting terminal 28 to an electrical conductor. Between the diaphragm and the mounting terminal 28 the walls 14 and 16 are provided with a rack-type pleat 36. This pleat will flex to provide for movement of the power element 12 in the plane of the diaphragm.

The other end of the power element has secured thereto a support 38 for the movable contact. This support, like the mounting terminal 28, has a slot 40 into which the bight 18 is fitted and secured by a weld, as indicated at 42, 42. The support 38 carries the movable contact 44 which engages with and disengages from a fixed contact 46 carried on a fixed support and terminal member 48. This latter member is held in place by the cooperation of the base 8 and cover 10 and carries a binding screw 50 or other suitable fastening by which it may be connected with an electrical conductor.

Thus when the contacts 44 and 46 are engaged the current flows through the walls 14 and 16 of the power element 12. When an overload occurs enough additional heat will be generated to effect expansion of the diaphragm with a snap action from the normal or collapsed position shown in Fig. 2 to the expanded position shown in Fig. 4. In order that this lateral expansion of the power element may be utilized to trip a latching mechanism, the central part of the diaphragm is provided with integral projections 52 fitting into annular openings at the inner ends of inwardly extruded portions 58, 58 on the legs 54 and 56 of the kick-out member a portion of which forms one element of a snap-on type pivotal connection between power element 12 and the kick-out member. The edge of each socket engages the adjacent wall of the diaphragm to provide a small area of contact between the diaphragm and the kick-out member to minimize the amount of heat conducted away from the power element and thus insure maximum sensitivity.

In order to provide a snap action opening of the contacts 44 and 46, a spring-biased kick-out member is pivotally connected to the diaphragm of the power element assembly 12 to normally urge it in a vertical direction. The kick-out member is locked in compressed position with such contacts closed by a latching mechanism which is unlatched by the expansion of the diaphrgam.

To conserve space and weight and for cheaper manufacture the kick-out member includes as one integral unit the kick-out spring and keeper. A sheet or ribbon of thin metal, preferably stainless steel, is folded to provide a pair of legs 54 and 56 (see Figs. 2 and 4) which straddle the diaphragm of power element 12. As previously described each of these legs is provided with a socket 58 which provides a snap-on pivotal connection between the power element 12 and the kick-out member. The leg 54 at its lower end is multiple-reflexed to form a spring 60, the lower end of which rests on the bottom of the base 8 and normally resiliently urges the kick-out member and the power element 12 in a vertical or upward direction tending to open the contacts 44 and 46. At the top of the spring 60 the leg 54 has a projection 62 constituting the keeper of the latching mechanism. When the diaphragm of power element 12 is collapsed, the keeper 62 is engaged by latch portion 66 of a C-shaped spring 70 to keep the contacts closed, as shown in Figs. 1 and 2. The lower portion of the leg 56 is provided with a slot 64 to accommodate the latch portion 66 and permit the kick-out member to move up and down without displacing such latch portion. It may be advisable to strengthen the legs 54 and 56 by lateral flanges on their sides. There is provided a slot 65 in the right-hand reflexes of the spring 60 to provide clearance for the latch portion 66 and for the lower end of the leg 56 when such spring is compressed. However, in some constructions it is possible to shorten the length of the folds of such spring so that there never is an overlapping relationship between the right-hand reflexes and such latch and leg.

The kick-out member is normally biased so that its legs 54 and 56 are sprung toward each other with sufficient force to maintain proper bearing contact at the snap-on pivotal connections when the diaphragm is collapsed. However, the diaphragm develops sufficient power to flex such legs apart against their inherent resiliency and against any resistance to lateral displacement created by the spring portion 60. In order that the keeper 62 will move to the left to the position shown in Fig. 4 as the diaphragm expands, the flanged leg 56 slides against the inside of the cover 10. Thus the expansion force supplied by the diaphragm of power element 12 must cause the leg 54 and the keeper 62 to move to the left relative to such cover and the latch portion 66 to disengage the keeper and latch. Vertical guides 68 may be formed on the base 8 to hold the kick-out member to reciprocating movement in a vertical path. Such guiding of the kick-out member will also have the secondary effect of guiding the power element 12 so that it moves in a path with the contact 44 in proper alinement with contact 46.

After overload conditions have caused an unlatching of the keeper 62 and latch portion 66 with the consequent snap opening of the contacts 44 and 46 by the operation of kick-out spring 60, it is necessary to manually reset the latching mechanism in order to snap the contacts to closed position. To accomplish this, a C-spring 70 and manual control lever 74 are used. The lower end of C-spring 70 is inturned to constitute the latch portion 66 and the upper end is inturned and fits within a hole 73 in the control lever 74 to provide a connection therebetween. This hole, upon the operation of the control lever, is moved clockwise from the position shown in Fig. 1 to a position substantially ninety degrees therefrom. During such movement, the ends of the C-spring 70 pass over a dead center alinement with respect to the axis of rotation of the control lever. The C-spring is slidably guided within a depression 76 formed in the inner surface of the cover 10 and shaped as shown in Fig. 6. The outline of this depression is also shown in broken line in Fig. 1 to show the camming action between such depression and the C-spring. The depression 76 has a concave edge forming a cam 78 which is engaged by the body of the C-spring 70 to cause the latch portion 66 to be moved upwardly toward and into a reset notch 80 in such depression as the control lever 74 is moved clockwise to the "reset" position. The depression 76 has a convex edge 82 which affords clearance for C-spring 70 during movement of the lever 74 in a counterclockwise direction to the "on" position. In moving lever 74 to the "on" position from "reset" position the C-spring 70 is moved with a snap action with sufficient force to overcome the force of the kick-out spring 60 and the inherent bias afforded by the pleats 36 of the power element 12 to effect closure of the contacts 44 and 46 with a snap action.

The control lever 74 is rotatably mounted by trunnions 84 mounted in bearings 86 in the base 8 and cover 10 and may be readily assembled and disassembled when the cover 10 is removed. It has a flat surface 88 which, when engaged by the top of the kick-out member when unlatched, will cause the control lever 74 to rotate to the "trip" position shown in the dotted lines of Fig. 1 to constitute a visible indication that the circuit breaker has been tripped open by an overload.

Starting from the "on" position shown in Fig. 1 a sequence of operations will be described. In the "on" position current is flowing from the terminals 28 and 48 through the power element assembly 12. If the circuit breaker becomes overloaded (due to flow of current exceeding the value for which diaphragm of power element 12 was calibrated) the increased electro-thermal heat generated by such excess current will vaporize the charge in the diaphragm and cause it to expand to the position shown in Fig. 4. Such expansion spreads the legs 54 and 56 and moves the keeper 62 out of engagement with the latch portion 66 permitting the spring 60 to move the kick-out member and the power element upwardly to the broken line position shown in Fig. 1, thus opening contacts 44 and 46 and breaking the circuit. The disengagement of the latch portion 66 causes the C-spring 70 to assume a relatively free position (neither compressed nor tensioned) so that as the top of the kick-out member strikes the flat area 88 the control lever 74 will be moved to the "trip" position shown in broken lines of Fig. 1.

While the diaphragm of power element 12 remains expanded it is impossible to close the circuit breaker because the latch 66 will not engage keeper 62. However, upon the opening of the circuit breaker the charge in the diaphragm quickly cools and the diaphragm will collapse to the position shown in Fig. 2 and the device after resetting may again be closed. To manually reset the circuit breaker the control lever 74 is moved clockwise to the "reset" position. This raises the C-spring 70 and its latch portion 66. The intermediate portion of the C-spring 70 engages the cam surface 78 and the latch portion 66 is forced into reset notch 80. When manual force is released from the control lever 74 the resiliency of the C-spring 70 will result in movement of such control lever counterclockwise to the "off" position illustrated in Fig. 6 and indicated in Fig. 1. Thereafter, the control lever 74, when moved counterclockwise from "off" position toward "on" position, compresses the C-spring 70, which coacts with cam surface 78 to cause the latch portion 66 to slide out of engagement with the notch 80 (see Figs. 1 and 6) and move with a snap action against the keeper 62 to effect snap closure of the circuit. When the lever 74 is manually moved from "on" toward "off" position the ends of C-spring 70 pass through the dead center with respect to the axis of rotation of the lever and the lever is moved ahead to "off" position, thus relieving the tension in the C-spring to a degree sufficient to permit the kick-out spring portion 60 to act upon the portion 66 of C-spring 70, thus assisting said portion 66 in overcoming the resistance to upward movement thereof over angled surface 80$^a$. This results in snap movement of portion 66 into reset notch 80 and simultaneous movement, with a snap action, of contact 44 out of engagement with stationary contact 46.

As shown in the modifications, Figs. 7 and 8, it is not necessary that projections be formed on the diaphragm. More particularly referring to Fig. 7, the walls 14$^b$ and 16$^b$ of the diaphragm 12$^x$ may have centrally located sockets 53—53 formed integrally therewith which are engaged by projections 55—55 on the legs 54$^a$ and 56$^a$ of the kick-out member. In another modification, shown in Fig. 8, wall 14$^c$ of the diaphragm 12$^y$ has a socket 57 and the adjacent leg 56$^b$ of the kick-out member has a projection 59 fitting into such socket, whereas the wall 16$^c$ has a projection 61 fitting into socket 63 on the other leg 54$^b$ of the kick-out member.

It is pointed out that the reference numerals applied to Figs. 1 to 6, inclusive, of the drawings correspond exactly with the reference numerals applied to corresponding parts in my aforementioned Patent Number 2,704,313; whereas in Figs. 9, 10 and 11 of the present application those parts identical with the parts shown in Figs. 1 to 6 hereof are given like numerals of reference; the modified parts shown in Figs. 9, 10 and 11 are given numerals corresponding to those of Figs. 1 to 6 hereof, but with the exponential letter "$x$" added. The magnetic trip members are, of course, given reference numerals individual thereto.

In the modified form of the invention illustrated in Figs. 9 to 11, inclusive, the housing consists of a base 8$^x$ and a cover 10$^x$ of molded insulating material. The base 8$^x$ is recessed to provide operating space for the circuit breaker and is formed for cooperation with the cover 10$^x$ to provide for securement of the elements of the circuit breaker in properly assembled relationship. The cover 10$^x$ is removably secured to the base 8$^x$ by suitable fastening means (not shown) and also has integral projections, as indicated by 8$^y$ to provide guides for the kick-out member and the parts carried thereby.

In the form of the device shown in Figs. 9 to 11 magnetic means for assisting in effecting the tripping operation is employed. Such magnetic means consists of two complementary iron members which are a fixed magnetic member 90 and a movable magnetic member 91. Member 90 comprises a relatively long substantially square leg portion 90ª, a curved connecting portion 90ᵇ, and a group of three downwardly projecting legs 92, and 94ª, 94ᵇ. The centrally located leg 92 is of such length and shape as to fit between and afford attachment thereof to the outwardly projecting flanges formed on the leg 56ˣ of the kick-out member. Such attachment may be effected by spot-welding at the four points indicated in Fig. 11. The outer legs 94ª and 94ᵇ are substantially parallel with, but preferably shorter than, the central leg 92. Magnetic member 91 comprises a pair of spaced upwardly extending legs 102ª and 102ᵇ adapted for cooperation with legs 94ª and 94ᵇ, respectively. The top portion of each leg 102ª and 102ᵇ is centrally notched to provide two upstanding lugs 104 and 106. Each lug 106 is offset laterally from the body of the respective legs so that said pairs of lugs straddle the pivots afforded by legs 94ª and 94ᵇ. Such pivotal relationship provides a good magnetic connection between members 90 and 91.

As the diaphragm of power element 12 expands under the influence of increased temperature electrically generated by the overload current the keeper 62ˣ is moved toward the left (Fig. 9). During such movement of keeper 62ˣ the portion 96 of element 91 is simultaneously moved closed to portion 90ª of element 90, through the medium of the connection between the pair of lugs 100 which are engaged by the walls of openings in the upper fold of the spring portion 60ˣ of the kick-out member, thus reducing the air gap between the portions 96 and 90ª aforementioned. As will be understood, the current flowing through the power element 12 induces in the electromagnetic elements 90 and 91 a magnetic field tending to move portion 96 toward portion 90ª. This electromagnetic or tractive force increases (due to reduction of said air gap) as the force generated in the diaphragm increases, and supplements such latter force to assist in effecting and insuring sufficient movement of the leg 54ˣ to accomplish the unlatching action smoothly and within a relatively short period of time. Moreover, it is to be understood that there is a value of short-circuit current at which the breaker would be tripped by magnetic force alone.

The operations of the manual control and reset mechanisms can be effected in the same way as aforedescribed.

Although several embodiments of the invention are shown and described herein, it is to be understood that the device is susceptible to various other changes in details of construction thereof without departing from the spirit of my invention as defined by the appended claims.

I claim:

1. In a circuit breaker, a pivotally mounted double-walled member having a terminal end, a movable contact carried by the other end of said member, a fixed contact in operative alinement with and engageable with and disengageable from said movable contact, an enclosed and sealed space between said walls defining an expansible diaphragm, a kick-out member having legs straddling said double-walled member and pivotally connected with said diaphragm, said legs being moved apart upon the expansion of said diaphragm, spring means associated with said double-walled member to normally urge said member in a direction to open said contacts, a keeper carried by one of said legs, a latch for engaging said keeper to hold said contacts closed, said keeper being moved out of engagement with said latch upon expansion of said diaphragm, a first magnetic element carried by said kick-out member, and a second magnetic element connected with said one of said legs and movable with said keeper, said magnetic elements having tractive relationship increased by the movement of said elements toward each other as said keeper is moved out of engagement with said latch.

2. A circuit breaker as claimed in claim 1, in which said first magnetic element has a support secured to the other of said legs, said second magnetic element has a pivotal interconnection with said first magnetic element, and in which said second magnetic element has lugs interengageable with said one of said legs to cause said magnetic elements to be moved together as said legs are moved apart.

3. In a circuit breaker having an electro-thermal power element, a kick-out member having legs adapted to straddle said power element and to be forced apart thereby upon expansion thereof, a magnetic element carried by one of said legs and extending along the outer side of the other of said legs, a second magnetic element positioned between the other of said legs and said first magnetic element and attracted by said first magnetic element, and means interconnecting said second magnetic element and said other of said legs whereby upon said legs being moved apart by expansion of said power element said magnetic elements are moved toward each other.

4. A circuit breaker as claimed in claim 3, in which said magnetic elements comprise the opposite poles of a magnet straddling said kick-out member legs and said magnet having its said elements pivotally interconnected, one of said magnet elements being fixed to said one of said legs to mount said magnet with one of its poles positioned to the outer side of the other of said kick-out member legs, the other of said magnet elements being offset toward said one of said magnet elements whereby the other pole of the magnet is between said first mentioned pole and said other kick-out member leg, and means interconnecting said other kick-out member leg and said other magnet element for conjoint movement.

5. In a circuit breaker having an expansible electro-thermal power element, a kick-out member with a first part for disposition and a second part on opposite sides of the expansible electro-thermal power element for movement apart thereby upon expansion thereof, a kick-out spring latch disengaged by the movement apart of said parts, a magnetic trip comprising a magnet having a first leg and a second leg pivotally interconnected whereby the poles of said magnet may be moved toward each other, said first leg being secured to said second part and having a first pole piece spaced outwardly of said first part, said second leg having a transverse portion extending therefrom toward said first leg and having clearance with respect to both said parts, a second pole piece carried by said transverse portion and positioned between said first pole piece and said first part, and interengaging lugs and holes on said second pole piece and said first part whereby the moving apart of said parts causes said pole pieces to move toward each other.

6. A vapor pressure type electro-thermal power element for a circuit breaker or the like comprising a thin sheet of metal having suitable spring and resistance characteristics folded upon itself to form two adjacent walls, said walls having annularly shaped inwardly offset portions welded together to form a circular double-walled diaphragm, said walls between said diaphragm and the ends of said walls being slightly spaced whereby heat generated in said walls by the passage of electric current therethrough will be more rapidly dissipated exteriorly of said diaphragm by the increased surface area in contact with atmosphere and less rapidly dissipated at the juncture of said offset portions and within the area of said diaphragm to increase the sensitivity of said diaphragm to electro-thermal changes in said element.

7. A vapor pressure type electro-thermal power element for a circuit breaker or the like comprising a thin sheet of heat hardenable stainless steel folded upon itself to form two adjacent walls, said walls having inwardly offset portions welded together to form an enclosed space providing a double-walled diaphragm, said walls between said diaphragm and the ends of said walls being slightly spaced whereby heat generated in said walls by the passage of electric current therethrough will be more rapidly dissipated exteriorly of said diaphragm by the increased surface area in contact with atmosphere and less rapidly dissipated at the juncture of said offset portions and within the area of said diaphragm to increase the sensitivity of said diaphragm to electro-thermal changes in said element.

8. An inherently calibrated vapor pressure type electro-thermal power element for a circuit breaker or the like comprising a pair of juxtapositioned metal walls which serve as an electric resistance heater, said walls intermediate their ends being joined together along a continuous seam to provide a diaphragm, said diaphragm being charged with volatile matter operable upon heating thereof by current passing through said walls to expand said diaphragm, said walls within said continuous seam being so shaped and stressed that the central portions thereof are inherently biased inwardly, and said diaphragm having a predetermined trip temperature depending upon the boiling point of the volatile matter and the pressure increment necessary to trip the diaphragm.

9. An inherently calibrated vapor pressure type electro-thermal power element for a circuit breaker or the like comprising a pair of juxtapositioned metal walls which serve as an electric resistance heater, said walls intermediate their ends being joined together along a continuous seam to provide a diaphragm, said diaphragm being charged with volatile matter operable upon heating thereof by current passing through said walls to expand said diaphragm, at least one of said walls within said continuous seam being so shaped and stressed that the central portion thereof is inherently biased inwardly, and said diaphragm having a predetermined trip temperature depending upon the boiling point of the volatile matter and the pressure increment necessary to trip the diaphragm.

10. An inherently calibrated vapor pressure type electro-thermal power element for a circuit breaker or the like comprising a pair of juxtapositioned metal walls which serve as an electric resistance heater, said walls intermediate said ends being joined together along a continuous seam to provide a diaphragm, said diaphragm being charged with volatile matter operable upon heating thereof by current passing through said walls to expand said diaphragm, said walls between said diaphragm and the ends of said walls being slightly spaced whereby heat generated in said walls by the passage of electric current there-through will be more readily dissipated exteriorly of said diaphragm by the increased surface area in contact with atmosphere and less rapidly dissipated at the juncture of the spaced portions and within the area of said diaphragm to increase the sensitivity of said diaphragm to electro-thermal changes in said element.

11. A vapor pressure type electro-thermal power element for a circuit breaker or the like comprising a pair of juxtapositioned metal walls which serve as an electric resistance heater, said walls intermediate the ends thereof being joined together along a continuous seam to provide a diaphragm, said diaphragm being charged with volatile matter operable upon heating thereof by current passing through said walls to expand said diaphragm, one end of said power element being fixedly mounted, and the other end of said power element being provided with electrical contact means, and said power element intermediate said one end and said diaphragm being provided with pleats to form a spring, whereby said diaphragm and said contact may be oscillated with respect to said one end.

12. A vapor pressure type electro-thermal power element for a circuit breaker or the like comprising a pair of juxtapositioned metal walls which serve as an electric resistance heater, said walls intermediate the ends thereof being joined together along a continuous seam to provide a diaphragm, said diaphragm being charged with volatile matter operable upon heating thereof by current passing through said walls to expand said diaphragm, one end of said power element being fixedly mounted, and the other end of said power element being provided with electrical contact means, and said power element interemdiate said one end and said diaphragm being provided with pleats formed about the plane of said walls to form a spring, whereby said diaphragm and said contact may be oscillated with respect to said one end of said power element in the plane of said walls.

References Cited in the file of this patent

UNITED STATES PATENTS

| | | |
|---|---|---|
| 1,848,668 | Scott | Mar. 8, 1932 |
| 1,971,205 | Walle | Aug. 21, 1934 |
| 2,035,743 | Frank et al. | Mar. 31, 1936 |
| 2,114,845 | Kubik | Apr. 19, 1938 |
| 2,184,372 | Von Hoorn | Dec. 26, 1939 |
| 2,323,784 | Baxter et al. | July 6, 1943 |
| 2,325,717 | Swingle | Aug. 3, 1943 |
| 2,328,406 | Atchison | Aug. 31, 1943 |
| 2,345,105 | Dorfman et al. | Mar. 28, 1944 |
| 2,366,091 | Eskin | Dec. 26, 1944 |
| 2,378,648 | Maseng | June 19, 1945 |
| 2,484,932 | Cox | Oct. 18, 1949 |
| 2,486,300 | Lindstrom et al. | Oct. 25, 1949 |
| 2,487,947 | Senn | Nov. 15, 1949 |
| 2,494,761 | Jackson et al. | Jan. 17, 1950 |
| 2,579,673 | Jackson | Dec. 25, 1951 |